3,019,116
CERAMIC BODY AND METHOD OF
MAKING THE SAME
Lionel J. Doucette, Pittsfield, Mass., assignor to General
Electric Company, a corporation of New York
No Drawing. Filed Oct. 11, 1957, Ser. No. 689,471
3 Claims. (Cl. 106—46)

The present invention relates to ceramic materials, and more particularly to a glass-bonded alumina ceramic body and an improved method of making the same.

Alumina (aluminum oxide) ceramic materials have found favor in the past because of their superior mechanical strength, excellent electrical properties and their relatively high resistance to heat and thermal shock. A difficulty encountered, however, in the manufacture of alumina ceramic materials is the relatively high temperature which must be attained to obtain maximum density in the semi-vitreous alumina body. Various types of fluxing materials such as clay have been added to the aluminum oxide in an attempt to lower the firing temperature, but these prior fluxes have not been found fully satisfactory for a number of reasons. For example, in many cases, they insufficiently lowered the vitrifying temperature, introduced undesirable impurities into the alumina composition, or caused the formation of bubbles or voids in the final fired product.

It is an object of the invention to provide a hard, dense, non-porous alumina ceramic body which can be formed at relatively low firing temperatures.

It is another object of the invention to provide an improved process of making a glass-bonded alumina body of the above characteristics wherein lower temperatures and shorter firing time may be employed than heretofore used to provide alumina ceramic products of equivalent density and mechanical and electrical properties.

It is still another object of the invention to provide a means for more uniformly distributing colorant materials in alumina ceramic bodies.

Other objects and advantages will become apparent from the following description and the appended claims.

The above objects are attained in accordance with the invention by mixing aluminum oxide with a high alumina content glass frit, with or without the addition of small amounts of carbonates or oxides of barium, potassium and calcium, forming the mixture into desired shape, and firing the shaped material to provide a semi-vitreous, dense, non-porous mass. By semi-vitreous it is meant herein that the body is partly formed of glass.

By employing the teaching of the invention it is possible to produce a leak-tight ceramic of about 85% aluminum oxide at relatively low firing temperatures, e.g., about 1250° C., and a 95% aluminum oxide body below 1400° C. as compared to firing temperatures in the neighborhood of 1500° C. to 1700° C. normally employed in the past for making alumina bodies of similar composition and properties.

A significant feature of the present invention resides in introducing a glass frit of the particular composition more fully described hereinafter into the alumina component to serve as a vitreous matrix in which the alumina particles are bonded during the process of heating the mixture in the firing step. The high alumina content of the glass frit serves to increase the alumina content of the final fired ceramic body and initiates the vitrification of the mass at an early stage in the firing cycle. As a result, the firing time is shortened and the firing temperature lowered.

To make the ceramic material in accordance with the invention, there is provided a composition, in percent by weight, of the following ingredients in the ranges indicated:

TABLE I

|  | Percent |
| --- | --- |
| Aluminum oxide | 65–95 |
| Glass frit (high alumina content) | 5–35 |
| Flux | 0–12 |

In a preferred composition, the flux comprises 0–12% of calcium carbonate or oxide, 0–3% of potassium carbonate or oxide, and 0–3% of barium carbonate or oxide. The fluxing materials are added to help reduce the firing temperature to which the mixture is subjected, and to otherwise facilitate the firing procedure.

The glass frit used in the above mixture is a high alumina content, highly weather-resistant, low thermal expansion glass having excellent electrical characteristics, a softening point of about 850° C., and high fluidity at 1200° C. The glass frit has the following approximate composition in percent by weight:

TABLE II

|  | Percent |
| --- | --- |
| Silica | 38.5–55 |
| Alumina | 15–25 |
| Calcium oxide | 8.5–17.5 |
| Magnesium oxide | 2.5–7.5 |
| Boric oxide | 12.5–25 |

The relatively high alumina and low silica content of this mixture produces a glass having increased resistance to thermal shock. The provision of alumina in the glass frit composition has been found to be of some advantage in making it possible to introduce part of the total alumina to the final mixture in an already fluxed condition.

The following are typical examples of glass frit compositions in percent by weight which may be used in the mixture set forth in Table I:

*Example I*

Glass frit ingredients:

|  | Percent |
| --- | --- |
| Silica | 47.5 |
| Alumina | 20.0 |
| Calcium oxide | 10.0 |
| Magnesium oxide | 7.5 |
| Boric oxide | 15.0 |

*Example II*

Glass frit ingredients:

|  | Percent |
| --- | --- |
| Silica | 42.5 |
| Alumina | 20.0 |
| Calcium oxide | 10.0 |
| Magnesium oxide | 7.5 |
| Boric oxide | 20.0 |

The following are illustrative of the mixtures which may be used to make the glass-bonded alumina body of the present invention, the compositions being in percent by weight:

*Example III*

Glass frit—alumina mixture:

|  | Percent |
| --- | --- |
| Aluminum oxide | 82.5 |
| Glass frit (Example I) | 11.5 |
| Calcium oxide | 5.0 |
| Barium carbonate | 0.5 |
| Potassium carbonate | 0.5 |

*Example IV*

Glass frit—alumina mixture:

|  | Percent |
| --- | --- |
| Aluminum oxide | 86.0 |
| Calcium carbonate | 2.5 |
| Potassium carbonate | 1.0 |
| Barium carbonate | 1.0 |
| Glass frit (Example II) | 9.5 |

When several samples of the above mixtures were pressed to desired shape and then fired at 1285° C. for about 12 hours, hard, vacuum-tight, semi-vitreous ceramic bodies having an average specific gravity of 3.33 were obtained. Similar samples heated at the same temperature for about 17 hours produced ceramic bodies having an average specific gravity of 3.46.

*Example V*

Glass frit—alumina mixture:

| | Percent |
|---|---|
| Aluminum oxide | 80.0 |
| Calcium oxide | 6.0 |
| Potassium carbonate | 0.5 |
| Barium carbonate | 0.5 |
| Glass frit (Example I) | 13.0 |

*Example VI*

Glass frit—alumina mixture:

| | Percent |
|---|---|
| Aluminum oxide | 70.0 |
| Calcium carbonate | 10.0 |
| Barium carbonate | 1.0 |
| Potassium carbonate | 1.0 |
| Glass frit (Example I) | 18.0 |

*Example VII*

Glass frit—alumina mixture:

| | Percent |
|---|---|
| Aluminum oxide | 70.0 |
| Calcium carbonate | 5.0 |
| Barium carbonate | 0.5 |
| Potassium carbonate | 0.5 |
| Glass frit (Example I) | 24.0 |

In the present invention, the preparation of the mixture to be fired is carried out in two steps. In the first step, the glass is made by known glass melting technique. The temperature of fusion should be at least as high as the firing temperature to which the ultimate mixture with alumina is subjected, this normally being about 1250° C.–1350° C. After fusion the glass is fritted and ball milled for a period of time to provide a glass powder (frit) of about 200 mesh size. The glass powder is then filtered and dried. Where colored ceramics are desired, the colorant material is added to the glass mixture before fusion.

In the second step, aluminum oxide and the additional fluxing materials, such as the carbonates or oxides of barium, potassium and calcium, are then added to the frit prepared as above, and this mixture is ball milled to produce a mass of particles having the size of 200 to 325 mesh. This mixture is then pressed and formed into desired shape in accordance with known ceramic forming techniques.

Thereafter the formed mass is subjected to a firing temperature of about 1250° C. to 1350° C. for a number of hours. As the temperature rises, the vitreous matrix begins to soften and bonds the alumina crystals forming a uniform mass of alumina crystals suspended in the glassy matrix. Upon cooling, this mass forms a hard, dense vacuum-tight body.

It has been found that in order to obtain such a hard, dense semi-vitreous ceramic body having over 85% corundum crystals at the reduced heating periods and temperatures in accordance with the invention, it is necessary to introduce a bonding component in the form of a glass frit as described above. When the raw materials of the glass bonding component were directly added to and mixed with the aluminum oxide and this mixture fired for the same period and temperature, the resulting product was a soft, porous body having very poor strength.

A particular advantage of this invention resides in the characteristic of the specified glass frit which when finely divided and uniformly distributed throughout the unfired ceramic mass will, when brought to the preferred firing range, rapidly fuse the alumina crystals to a homogeneous, dense, semi-vitreous ceramic body which after cooling exhibits a deformation temperature appreciably higher than the fusion temperature of the original glass.

A further noteworthy feature of the invention is the discovery that the coloration of alumina ceramic bodies can be very easily controlled and distributed homogeneously if the desired colorants are added to the glass raw materials in making the glass frit. In past methods wherein colorants were added directly to the alumina before the firing step, spotty and irregular coloration frequently resulted in spite of apparently thorough mixture of the ingredients.

The following is an example of a glass frit composition containing a blue colorant material, which is illustrative of this aspect of the present invention.

*Example VIII*

Glass frit ingredients:

| | Percent |
|---|---|
| Aluminum oxide | 19.6 |
| Silica | 48.7 |
| Calcium oxide | 9.5 |
| Magnesium oxide | 6.9 |
| Boric oxide | 14.8 |
| Cobalt oxide | 0.5 |

Instead of the cobalt oxide, other siutable colorant materials may be used, e.g., the oxides of uranium, nickel, manganese, cerium and other known coloring substances.

The alumina ceramic material provided in accordance with the invention may be used for a variety of purposes and products, among which are electrical and thermal insulators, crucibles, refractory linings, and other articles subject to severe electrical or thermal conditions.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What I claim as new and desire to secure by Letters Patent of the United States is:

1. A dense, non-porous glass-bonded alumina ceramic body formed by firing at a temperature of about 1250–1350° C. a mixture having the following approximate composition in percent by weight:

| | Percent |
|---|---|
| Aluminum oxide | 65–95 |
| Alumina borosilicate glass frit | 5–35 | said mixture also including flux material comprising 0–12% of a calcium compound selected from the group consisting of calcium oxide and calcium carbonate, 0–3% of a potassium compound selected from the group consisting of potassium oxide and potassium carbonate, and 0–3% of a barium compound selected from the group consisting of barium oxide and barium carbonate, said glass frit having approximately the following composition in percent by weight:

| | Percent |
|---|---|
| Silica | 38.5–55 |
| Alumina | 15–25 |
| Calcium oxide | 8.5–17.5 |
| Magnesium oxide | 2.5–7.5 |
| Boric oxide | 12.5–25 |

2. A dense, non-porous glass-bonded alumina ceramic body formed by firing at a temperature of about 1250–1350° C. a mixture having the following approximate composition in percent by weight:

| | Percent |
|---|---|
| Aluminum oxide | 82.5 |
| Glass frit | 11.5 |
| Calcium oxide | 5.0 |
| Barium carbonate | 0.5 |
| Potassium carbonate | 0.5 | said glass frit having the following approximate composition in percent by weight:

| | Percent |
|---|---|
| Silica | 47.5 |
| Alumina | 20.0 |
| Calcium oxide | 10.0 |
| Magnesium oxide | 7.5 |
| Boric oxide | 15.0 |

3. The method of making a dense, non-porous ceramic body which comprises forming a mixture having the following approximate composition in percent by weight:

| | Percent |
|---|---|
| Aluminum oxide | 65–95 |
| Glass frit | 5–35 |
| Flux | 0–12 | said glass frit having the following approximate composition in percent by weight:

| | Percent |
|---|---|
| Silica | 38.5–55 |
| Alumina | 15–25 |
| Calcium oxide | 8.5–17.5 |
| Magnesium oxide | 2.5–7.5 |
| Boric oxide | 12.5–25 | pressing said mixture into a shaped mass, and firing said shaped mass at a temperature of about 1250° C. to 1350° C.

References Cited in the file of this patent

UNITED STATES PATENTS

| | | |
|---|---|---|
| 1,966,408 | Hauman | July 10, 1934 |
| 2,435,995 | Armistead | Feb. 17, 1948 |
| 2,474,636 | Oesterle et al. | June 28, 1949 |
| 2,480,672 | Plank | Aug. 30, 1949 |
| 2,711,975 | Wainer et al. | June 28, 1955 |
| 2,730,439 | Houchins | Jan. 10, 1956 |
| 2,887,394 | Bickford et al. | May 19, 1959 |

OTHER REFERENCES

Webster's Unabridged Dictionary, Second Edition, page 1010, 1959.

UNITED STATES PATENT OFFICE
CERTIFICATE OF CORRECTION

Patent No. 3,019,116                 January 30, 1962

Lionel J. Doucette

It is hereby certified that error appears in the above numbered patent requiring correction and that the said Letters Patent should read as corrected below.

Column 4, line 47, strike out "Alumina borosilicate".

Signed and sealed this 5th day of June 1962.

(SEAL)
Attest:

ERNEST W. SWIDER
Attesting Officer

DAVID L. LADD
Commissioner of Patents